United States Patent [19]

McKinney et al.

[11] Patent Number: 4,751,262

[45] Date of Patent: Jun. 14, 1988

[54] ETHYLENE-ACRYLIC ACID TYPE INTERPOLYMER COMPOSITIONS AND FILMS HAVING INCREASED SLIP AND REDUCED BLOCK

[75] Inventors: Osborne K. McKinney, Lake Jackson, Tex.; Alfred F. Castello, Midland, Mich.; Michael E. Rowland, Clute, Tex.

[73] Assignee: The Dow Chemical Company, Midland, Mich.

[21] Appl. No.: 69,471

[22] Filed: Jul. 2, 1987

Related U.S. Application Data

[63] Continuation-in-part of Ser. No. 771,954, Sep. 3, 1985, abandoned.

[51] Int. Cl.$^4$ .............................................. C08K 5/16
[52] U.S. Cl. ................................. 524/231; 524/230; 524/232; 524/423; 524/432; 524/433; 524/437; 524/445; 524/448; 524/451; 524/493
[58] Field of Search ............... 524/230, 231, 232, 423, 524/427, 432, 433, 437, 445, 448, 451, 493

[56] References Cited

U.S. PATENT DOCUMENTS

| | | | |
|---|---|---|---|
| 2,991,265 | 7/1961 | Clark et al. | 524/232 |
| 3,104,232 | 9/1963 | Clark et al. | 524/232 |
| 3,108,981 | 10/1963 | Clark et al. | 524/232 |
| 3,470,122 | 9/1969 | Ridgeway | 524/230 |
| 3,595,827 | 7/1971 | Foster | 524/230 |
| 3,597,382 | 8/1971 | Foster | 524/232 |
| 3,763,059 | 10/1973 | Needham et al. | 524/230 |
| 3,891,587 | 6/1975 | Watts | 524/231 |
| 4,248,990 | 2/1981 | Pieski et al. | 526/318.6 |
| 4,394,474 | 7/1983 | McKinney et al. | 524/232 |
| 4,395,510 | 7/1983 | Park | 524/232 |
| 4,430,289 | 2/1984 | McKinney | 264/564 |
| 4,490,324 | 12/1984 | Mollison | 524/230 |
| 4,529,764 | 7/1985 | McKinney et al. | 524/232 |
| 4,538,531 | 9/1985 | Wong | 524/232 |
| 4,599,392 | 7/1986 | McKinney et al. | 526/329 |

FOREIGN PATENT DOCUMENTS

| | | | |
|---|---|---|---|
| 2345006 | 3/1974 | Fed. Rep. of Germany | 524/230 |
| 0038421 | 12/1970 | Japan | 524/230 |
| 0008234 | 1/1982 | Japan | 524/230 |
| 0141224 | 8/1983 | Japan | 524/232 |
| 0068357 | 4/1984 | Japan | 524/232 |

*Primary Examiner*—Joseph L. Schofer
*Assistant Examiner*—J. M. Reddick
*Attorney, Agent, or Firm*—Daniel L. Lundeen

[57] ABSTRACT

Ethylene-acrylic acid type interpolymer compositions and films having increased slip and reduced block. A compositionally uniform interpolymer is compounded with at least one amide additive of the formula $R_1$-CO-NH-$R_2$ in which $R_1$ is selected from saturated alkyl groups having from 13 to 25 carbon atoms and mono-olefinically unsaturated alkyl groups having from 17 to 23 carbon atoms and in which $R_2$ is selected from saturated alkyl groups having 14 to 26 carbon atoms and mono-olefinically unsaturated alkyl groups having from 18 to 24 carbon atoms; and optionally, finely divided inorganic. In another embodiment, a compositionally uniform or a compositionally non-uniform interpolymer is compounded with: (i) about 0.025–1 weight percent of saturated secondary fatty acid amide; (ii) about 0.025–1 weight percent of unsaturated or mixed unsaturated secondary fatty acid amide; and optionally (iii) about 0.025–1.5 weight percent of finely divided inorganic.

32 Claims, No Drawings

ETHYLENE-ACRYLIC ACID TYPE INTERPOLYMER COMPOSITIONS AND FILMS HAVING INCREASED SLIP AND REDUCED BLOCK

This is a continuation-in-part of U.S. application Ser. No. 771,954, filed Sept. 3, 1985, now abandoned.

FIELD OF THE INVENTION

This invention relates to compositions of ethylene interpolymerized with acrylic acid, methacrylic acid and ionomers thereof which contain additives for substantially reducing the block and increasing the slip characteristics of films made from the composition.

BACKGROUND OF THE INVENTION

Films made from various ethylene interpolymers, viz. ethylene-acrylic acid, ethylene-methacrylic acid and ionomers thereof are well known. Such interpolymers are prepared commercially in high pressure reactors at elevated temperatures in the presence of free radical catalyst. Depending on the conditions of synthesis, the interpolymer may be compositionally uniform and either random or non-random, or it may be compositionally non-uniform.

As described in U.S. Pat. No. 4,248,990, by compositionally uniform it is meant that substantially all of the polymer molecules have substantially the same chemical composition while the molecular weight thereof may vary. Randomness is generally measured by the ratio of percent adjacent interpolymerized acid to total percent interpolymerized acid in the interpolymer. When this ratio is above 0.44, the interpolymer is considered to be non-random, while below 0.44 it is considered to be random.

Also as described in U.S. Pat. No. 4,248,990, the synthesis conditions will determine whether the interpolymerization is one-phase operation or two-phase operation. Generally, as the pressure and temperature of the reactor are reduced, there will be a transition from one-phase operation to two-phase operation evidenced by an increase in initiator demand, development of a significant temperature spread in the reactor, and the requirement of more power to maintain constant agitator speed, while the interpolymer product will exhibit a narrower molecular weight distribution, a decrease in the slope of the shear rate-shear stress curve for the melt, an increase in the environmental stress crack resistance, an increase in the maximum draw rate for film or filament, and an increase in the ratio of percent adjacent acid to percent total acid. The interpolymer produced in two-phase operation will be compositionally non-uniform, while that produced in one-phase operation will be compositionally uniform. In one-phase interpolymerization just above the transition zone, the interpolymer product will be non-random, but will be increasingly random as the pressure and temperature are elevated above the transition zone. At pressures more than 3.3 MPa above and temperatures more than 15° C. above the transition zone, the interpolymer product is substantially random. When the synthesis conditions are at least about 26.7 MPa above and about 20° C. above the transition zone, the interpolymer product exhibits superior physical properties and surprisingly excellent optical properties. These superior random ethylene interpolymers and their method of preparation are disclosed in U.S. Pat. No. 4,599,392.

Various additives for improving slip and antiblocking characteristics of ethylene interpolymers containing acrylic acid, methacrylic acid and ionomers thereof have been known. Some of these were known before the above described effect of synthesis conditions on interpolymer properties was known. For example, U.S. Pat. No. 3,597,382 described ethylene copolymers containing 2–25 wt. % of an $\alpha,\beta$-ethylenically unsaturated carboxylic acid copolymerized therein and having a melt index of 0.01–50 dg/min, or inorganic salts thereof, in which the slip characteristics were improved by incorporating therein 0.02–1.0 wt. % of a secondary fatty acid amide of the formula $R_1$—CO—NH—$R_2$ wherein $R_1$ was a mono-olefinically unsaturated hydrocarbon radical having 20–24 carbon atoms and $R_2$ was a saturated alkyl group having 14–26 carbon atoms. Secondary fatty acid amides in which $R_1$ was saturated or in which $R_2$ was mono-olefinically unsaturated were reported to be ineffective in improving the slip characteristics of the ethylene interpolymers into which it was incorporated.

Similarly, U.S. Pat. No. 3,595,827 described ethylene interpolymer compositions containing in addition to the secondary fatty acid amide of U.S. Pat. No. 3,597,382, 0.01–2 wt. % of synthetic amorphous silica having a surface area of 175–400 m$^2$/g, a pore size of 80–250 A, at an average particle size of 0.5–8 microns which synergistically improved the slip characteristics of the ethylene interpolymers, and also improved the antiblocking characteristics thereof.

Because of the state of technology extant at that time, it is believed that the ethylene interpolymers employed in the compositions in U.S. Pat. Nos. 3,597,382 and 3,595,827 were compositionally non-uniform, prepared in two-phase operation.

SUMMARY OF THE INVENTION

In one aspect of the invention, it has been discovered that the slip and block characteristics of a polar ethylene interpolymer, regardless of the synthesis conditions thereof, are synergistically improved when there is compounded therewith a saturated secondary fatty acid amide of the formula $R_1$—CO—NH—$R_2$, wherein $R_1$ and $R_2$ are both saturated alkyl groups, and an unsaturated or mixed unsaturated secondary fatty acid amide of the formula $R_3$—CO—NH—$R_4$, wherein $R_3$ and $R_4$ are alkyl groups, at least one of which is mono-olefinically unsaturated. In addition, the slip and block characteristics of the ethylene interpolymer are further improved by compounding therewith finely divided inorganic.

In another aspect of the invention, it has been discovered that the handleability characteristics of an ethylene interpolymer, regardless of the synthesis conditions thereof, are improved when the interpolymer has compounded therewith an unsaturated secondary fatty acid amide of the formula $R_5$—CO—NH—$R_6$, wherein $R_5$ and $R_6$ are alkyl groups which are mono-olefinically unsaturated.

In still another aspect of the invention, it has been discovered that the handleability characteristics of a polar ethylene interpolymer prepared above the two-phase transition zone are improved when the interpolymer has compounded therewith a mixed unsaturated secondary fatty acid amide of the formula $R_7$—CO—NHR$_8$, wherein $R_7$ is a saturated alkyl group and $R_8$ is a mono-olefinically unsaturated alkyl group. In addition, the slip and block characteristics of the compositionally uniform ethylene interpolymer are further improved by compounding therewith a finely divided inorganic.

DETAILED DESCRIPTION OF THE INVENTION

The types of ethylene interpolymers which may be employed in the composition of the present invention are the compositionally uniform interpolymers, including the non-random, random, and superior random interpolymers, and also the compositionally non-uniform interpolymers, with the superior random ethylene interpolymers being preferred. As used herein, the term "compositionally non-uniform" is used in reference to ethylene interpolymers prepared below the two-phase transition zone. The term "non-random" is used in reference to the compositionally uniform ethylene interpolymers which have been prepared just above the two-phase transition zone, i.e. 0–3.3 MPa and 0°–15° C. thereabove, and which have a ratio of percent interpolymerized adjacent acid to the total percent interpolymerized acid of about 0.44–1.0. The term "superior random" is used in reference to the compositionally uniform ethylene interpolymers which have been prepared well above the two-phase transition zone, i.e. at least about 26.7 MPa and 20° C. thereabove, and which have a ratio of percent interpolymerized adjacent acid to total percent interpolymerized acid less than about 0.44. The term "random" is used in reference to the compositionally uniform ethylene interpolymers, excluding the superior random interpolymers, which have been prepared above the two-phase transition zone, i.e. about 3.3–26.7 MPa or about 15°–20° C. thereabove, and which have a ratio of percent interpolymerized adjacent acid to the total percent interpolymerized acid less than about 0.44. The term "compositionally uniform" is used collectively in reference to the non-random, random and superior random ethylene interpolymers prepared above the two-phase transition zone.

Regardless of the type of ethylene interpolymer employed, it will have acrylic acid or methacrylic acid interpolymerized therein. The amount of acrylic acid or methacrylic acid interpolymerized in the ethylene-acrylic acid or -methacrylic acid interpolymers employed in the composition may be from about 2 to about 35 percent by weight of the interpolymer, preferably from about 5 to about 20 percent by weight of the interpolymer.

Also suitable as the interpolymer in the composition of the present invention are the inorganic salts, or "ionomers", of the ethylene-acrylic acid interpolymers and the ethylene-methacrylic acid interpolymers with the acid content described above in which from about 5 to about 95 percent of the carboxyl groups therein are neutralized with metal cations to form ionically crosslinked products. Representative metal cations include, for example, cations of zinc, sodium, magnesium, potassium, lithium, calcium, barium and the like. For convenience, these inorganic salts are collectively referred to hereinbelow as ionomers.

The melt flow value of the ethylene interpolymers employed may be from about 0.01 to about 50 dg/min, preferably from about 0.5 to about 25 dg/min. As used herein, melt flow value is measured according to ASTM D-1238 condition E (190° C./2.160 kg) unless otherwise indicated.

The secondary fatty acid amides which may be employed in the composition of the present invention have the general formula:

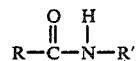

wherein R is selected from the group consisting of saturated alkyl groups having from 13 to 25 carbon atoms and mono-olefinically unsaturated alkyl groups having from 17 to 23 carbon atoms, and R' is selected from the group consisting of saturated alkyl groups having from 14 to 26 carbon atoms and mono-olefinically unsaturated alkyl groups having from 18 to 24 carbon atoms. As used in this detailed description to describe the secondary fatty acid amides unless otherwise noted, the term "saturated" refers to the secondary fatty acid amides in which both R and R' are saturated; the term "unsaturated" refers to the secondary fatty acid amides in which both R and R' are mono-olefinically unsaturated; and, the term "mixed unsaturated" refers to the secondary fatty acid amides in which either R or R' is mono-olefinically unsaturated and the other R or R' is saturated.

Representative specific examples of amide groups containing a saturated alkyl group corresponding to R in the secondary fatty acid amides include lauramide, palmitamide, stearamide, arachidamide, behenamide, lignoceramide, cerotamide, and the like. Representative specific examples of amide groups containing an unsaturated alkyl group corresponding to R in the secondary fatty acid amides include oleamide, elaidamide, vaccenamide, erucamide, and the like.

Representative specific examples of saturated alkyl groups corresponding to R' in the secondary fatty acid amides include lauryl, palmityl, stearyl, arachidyl, behenyl, lignoceryl, cerotyl, and the like. Representative specific examples of the unsaturated alkyl groups corresponding to R' in the secondary fatty acid amides include oleyl, elaidyl, vaccenyl, erucyl, and the like.

The finely-divided inorganics which may be employed in the composition of the invention are, for example, naturally occurring clay, aluminum silicate, diatomaceous earth, silica, talc, limestone, fumed silica, magnesium sulfate, magnesium silicate, alumina trihydrate, magnesium oxide, zinc oxide, and the like, with the siliceous materials being preferred. The finely-divided inorganic preferably has a surface area of from about 0.7 to about 7.5 m$^2$/g, an oil absorption value of from about 21 to about 175 g oil per 100 g inorganic, and a weight average particle size of from about 0.02 to about 30 microns with at least about 60 percent of the inorganic particles being less than or equal to the weight average particle size.

According to the present invention, one or more of the secondary fatty acid amides are employed in the composition in an amount of from about 0.05 to about 2 percent by weight of the composition. Used alone, the saturated secondary fatty acid amides function primarily to reduce the block characteristics (i.e. to improve the antiblock characteristics) of the interpolymer, whereas the unsaturated and mixed unsaturated secondary fatty acid amides function primarily to increase slip characteristics.

The slip and/or antiblock characteristics of the compositionally non-uniform, the non-random, the random, and the superior random ethylene interpolymers are synergistically improved when a saturated secondary fatty acid amide is employed in the composition, preferably in an amount of from about 0.025 to about 1 percent by weight of the composition, in combination with either an unsaturated or a mixed unsaturated secondary fatty acid amide, preferably in an amount of from about 0.025 to about 1 percent by weight of the composition. This is a truly synergistic result in that, at the same concentration of total additives, this combination of secondary fatty acid amides results in slip and/or antiblock characteristics which are more improved than when any type of secondary fatty acid amide is used alone.

The slip and/or antiblock characteristics of the composition are further improved when a finely-divided inorganic is employed, preferably in an amount of from about 0.025 to about 1.5 percent by weight of the composition, either with the combination of saturated with unsaturated or mixed unsaturated secondary fatty acid amides. A synergistic improvement is also observed when the inorganic is employed with the saturated secondary fatty acid amides alone, but the resulting slip characteristics of the composition are not generally commercially acceptable unless an unsaturated or mixed unsaturated secondary fatty acid amide is also present.

In addition, the optical properties of the composition are not substantially different from those of the ethylene interpolymer without the additives.

In contrast to the compositionally non-uniform ethylene interpolymers in which, according to U.S. Pat. No. 3,597,382, only the mixed unsaturated secondary fatty acid amides of the above formula wherein R is unsaturated and R' is saturated are effective in increasing slip, it has been found that certain unsaturated secondary fatty acid amides are effective in improving slip characteristics of the ethylene interpolymers described above. For the compositionally uniform interpolymers, the unsaturated secondary fatty acid amide has the formula

wherein R is selected from the group consisting of mono-olefinically unsaturated alkyl groups having from 17 to 23 carbon atoms, preferably 19 to 23 carbon atoms, and especially 21 carbon atoms, and $R_6$ is selected from the group consisting of mono-olefinically unsaturated alkyl groups having from 18 to 24 carbon atoms, preferable 20 to 24 carbon atoms, and especially 22 carbon atoms. For the compositionally non-uniform interpolymers, $R_5$ in the above formula should be a 19–23 carbon atoms unsaturated alkyl group, preferably 21 carbons, and $R_6$ should be a 20–24 carbon unsaturated alkyl group, preferably 22 carbons.

Also in contrast to the U.S. Pat. No. 3,597,382, it has been found that a mixed unsaturated secondary fatty acid amide of the above formula, wherein $R_5$ is a saturated alkyl group having 13–25 carbon atoms, preferably 17–25 carbon atoms, and $R_6$ is a mono-olefinically unsaturated alkyl group having 18–24 carbon atoms, preferably 20–24 carbon atoms, and especially 22 carbon atoms, are effective in improving the slip characteristics of compositionally uniform ethylene interpolymers to a commercially acceptable extent.

In the single additive system, the higher molecular weight secondary fatty acid amides appear to be more effective than the corresponding low molecular weight additives. Generally, the more random the ethylene interpolymer, the more polar the interpolymer, and hence the less "soluble" the higher molecular weight additive, and especially the higher molecular weight amide substituent ($R_5$) of the additive. The less soluble the additive, the better the "bloom," and hence, the better improvement in slip characteristics. Thus, higher molecular weight additives such as erucyl stearamide are generally effective in all compositionally uniform ethylene interpolymers, whereas the lower molecular weight additives such as oleyl palmitamide are generally also effective in the superior random ethylene interpolymers. Similarly, erucyl erucamide is generally effective in compositionally uniform and non-uniform interpolymers, whereas oleyl oleamide is also generally effective in the superior random interpolymers but generally ineffective in the compositionally non-uniform interpolymers.

The compositions according to this invention are readily prepared by intimately admixing the ethylene interpolymer with the secondary fatty acid amides and any inorganic. Mixing of the required components is readily carried out in a conventional mixing apparatus such as Banbury mixer or screw-type extruder.

The films according to this invention are readily prepared by extruding the resulting mixture in the form of a clear, flexible, blown bubble tube which is subsequently cooled and collapsed onto rolls or is collapsed and conveyed through appropriate heat sealers and cutters, packaging and packaging structures where the ethylene interpolymer composition is employed at thicknesses in the range of about 0.1 to about 12 mils. The compositions may also be employed in co- and multilayer extrusions.

In one embodiment, wherein the mixing device is a screw-type extruder, the additives are fed into the barrel of the extruder. The extruded mixture may be mixed with additional interpolymer(s) prior to final extrusion or may be fed directly into an extruder equipped with an annular die and extruded in the form of an inflated bubble or thin wall parison.

In a preferred embodiment, the mixing and extruding steps are carried out in a single apparatus which is a typical screw-type extruder that is equipped with a circular die and feed means placed along the extruder barrel which houses the screw or screws of the extruder. The secondary fatty acid amides and any inorganic are introduced as the polymer is being extruded at a rate such that a constant mixture is maintained. Similarly, concentrated master batches can be added to virgin material in the screw-type extruder.

The slip and block characteristics of the composition are tested by compounding the additives with the ethylene interpolymer and extruding the mixture into film by the blown film method.

The slip characteristic is delineated by the coefficient of friction (COF) which is measured on a flat, highly polished horizontal metal plane using a specimen "sled", a strain cell with a 0–300 gram range connected to a 10 millivolt recorder, and a driving force which moves the plane at the rate of 2.54 cm per 10 seconds. The sled is a 200 gram flat slab of stainless steel measuring 6.35 cm by 6.35 cm by 0.635 cm thick with the bottom surface covered with a sheet of sponge rubber. The specimen film which measures 10.2 cm by 10.2 cm is first conditioned at 23° C. and 50% relative humidity for 8 hours before testing, and is then affixed against the sponge rubber surface of the sled. The sled with the specimen attached thereto is connected to the strain cell with the specimen in contact with the plane. Film-to-film measurements are made by covering the plane with the same film from which the specimens were obtained; film-to-metal measurements are made by placing the specimen affixed to the sled directly on the metal surface of the plane. The driving force moves the plane horizontally and the sled is held stationary by the strain cell. The pulling force against the strain cell, caused by friction between the sled and plane, is recorded. The initial maximum peak reading is taken as the static force at which the relative movement between the film/film or film/metal surfaces begins. Kinetic force, the amount of force required to maintain the relative movement after it has started, is taken as the average of seven 2.54-cm-spaced readings from the recorder. The static and kinetic coefficients of friction are then computed by the following equations Static COF=(static force, g)/(200 grams); and Kinetic COF=(sustained motion force, g)/(200 grams).

A film-to-film COF of less than 0.30 and a film-to-metal COF of less than 0.40 generally permit good handling for packaging processes.

Blocking is measured by employing a balanced beam which is provided with an empty water reservoir dangling from one end and a block measuring 9.525 cm by 9.525 cm by 2.54 cm (about 91 cm² face) dangling from the other end. Immediately below the 91 cm² block is a similar 91 cm² block, the two 91 cm² flat surfaces just touching together when no weight is applied to either end of the balance beam. The lower block is fixed and does not move. The balance beam rests on a blade-edge fulcrum and is very sensitive to small weights. Two film specimens, each measuring about 15.2 cm by 15.2 cm are brought together so that a complete side or face of one specimen is totally against a complete side or face of the other. The two-ply specimen so formed is centered between the two 91 cm² blocks with the two blocks touching the upper and lower surfaces of the two-ply specimen, respectively. The protruding edges of the two-ply specimen are separated from each other by hand and the freed edges of the upper ply are fixed to the outer edges of the upper block and lower block respectively, e.g. with a rubber band or adhesive, leaving the 91 cm² portion of the two-ply specimen still clinging, ply-to-ply between the blocks. When the specimen is ready for testing, the restraint on the beam is removed and water is rapidly dripped into the reservoir on the other end of the beam. For consistency from test to test, the rate of water dripping is at a substantially constant rate such that the drips are too fast to be easily counted. When the two plys of film become parted, the water addition is stopped and the weight of water in the reservoir is determined in grams. Each test of block is repeated a plurality of times and the results averaged. As reported herein, the block values are taken as the average of four specimens unless otherwise indicated.

From experience, the following approximate block ranges may be arbitrarily assigned the corresponding relative effect on handleability and processing, although these ranges may change depending on the particular equipment and film compositions employed:

| Approx. Block Range (g) | Relative Effect |
| --- | --- |
| About 40 to about 100 | A good acceptable range which generally gives no handling or unwinding problems. |
| About 100 to about 150 | A high block range where one may encounter some handling and alignment problems as well as slower and jerky unwinding. |
| Greater than 150 | An excessive block range wherein handling problems are very pronounced and unwinding is seriously hampered; with very thick films one may encounter destructive block where unwinding causes tears or stretching and roll stock may completely solidify. |

Film gloss and percent haze are determined according to ASTM D-1746 and ASTM D-1003-52, respectively.

The following examples are given as illustrations of the invention and are not to be construed as limiting its scope. Throughout this specification and claims, all parts and percentages are by weight unless otherwise indicated.

COMPARISON I

A blown film sample was prepared by first compounding the following recipe at 177° C. in a 6.35 cm, 20/1 L/D compounding extruder that was equipped with a metering, compression and mixing section:

- 0.3 parts oleyl palmitamide;
- 0.2 parts stearyl stearamide;
- 0.1 parts diatomaceous earth (obtained under the designation Celite 455); and
- 49.4 parts ethylene-acrylic acid interpolymer (approximately 9 weight percent acrylic acid, melt flow value 1.5; prepared at single phase synthesis conditions about 26.7 MPa above and about 20° C. above its respective phase transition zone).

The pelletized product from the extruder was fabricated into 61 cm lay flat film by usual inflation techniques on a 5.08 cm Gloucester blown film unit at 204° C. plastic temperature. The resultant film sample possessed a film-to-film kinetic and static COF of 0.15 and 0.18, respectively, a 20° film gloss of 23.7, a film haze of 5.70 percent and 43 grams of film blocking.

In comparison thereto, the above procedure was performed utilizing the same ethylene-acrylic acid interpolymer without the inclusion of the amides or the diatomaceous earth. The resultant film had severe handling problems (i.e., a film-to-film kinetic and static COF of 1.16 and 0.97, respectively, and 159 grams film blocking) with substantially equivalent optical properties (i.e., a 20° film gloss of 21.6 and a film haze of 5.5 percent).

COMPARISON II

The procedure of Comparison I was employed to demonstrate the synergistic effect of the amides and inorganic in the composition. A similar ethylene interpolymer (9 wt. % acrylic acid, melt flow value 3.0, synthesis at 26.7 MPa above and 20° C. above its respective phase transition zone) was used to prepare the films with and without various combinations of amides and- /or inorganic at the same concentration of total additives. The composition and handling and optical characteristics are summarized in Table I. As can be seen, a combination of any two of any of the three additives (oleyl palmitamide, stearyl stearamide and inorganic) results in improved slip characteristics in comparison to either one of the additives alone; however, only combinations of the saturated amide with the mixed unsaturated amide, or of saturated amide and the mixed unsaturated amide with the inorganic, resulted in films with acceptable block and optics, as well as slip.

COMPARISON IV

Additional data confirming the results of Comparisons I, II and III was obtained by employing films and procedures similar to those of Comparisons I, II and III except that the ethylene-acrylic acid interpolymer had a melt flow value of 2.5, contained 6.5 weight percent acrylic acid and was prepared at 31.0 MPa and 25° C. above its respective phase transition zone, and that the interpolymer was fabricated into 12.7 cm layflat film on a 1.27 cm Killion blown film unit at 204° C. plastic

TABLE I

| Run[1] | Amide, ppm OP[2] | Amide, ppm SS[3] | Inorganic, ppm[4] | Coefficient of Friction[5] Film-to-Film Static | Coefficient of Friction[5] Film-to-Film Kinetic | Coefficient of Friction[5] Film-to-Metal Static | Coefficient of Friction[5] Film-to-Metal Kinetic | Block, g[6] | Gloss[7] 20° | Gloss[7] 45° | Percent Haze[8] |
|---|---|---|---|---|---|---|---|---|---|---|---|
| 3* | None | None | None | 1.26 | 1.16 | 0.30 | 1.17 | 279.3 | 29.0 | 65.0 | 4.74 |
| 4  | 8000 | None | None | 0.20 | 0.17 | 0.26 | 0.39 | 139.4 | 22.5 | 59.3 | 5.27 |
| 5* | None | 8000 | None | 0.60 | 0.80 | 0.27 | 0.35 | 66.2 | 32.5 | 67.3 | 4.36 |
| 6* | None | None | 8000 | 0.75 | 0.79 | 0.25 | 0.20 | 63.3 | 21.2 | 55.4 | 9.90 |
| 7  | 4000 | None | 4000 | 0.17 | 0.16 | 0.26 | 0.22 | 123.3 | 23.3 | 58.0 | 7.76 |
| 8* | None | 4000 | 4000 | 0.36 | 0.39 | 0.18 | 0.28 | 86.7 | 24.9 | 59.6 | 7.50 |
| 9  | 4000 | 4000 | None | 0.15 | 0.25 | 0.13 | 0.38 | 86.8 | 22.8 | 65.5 | 5.09 |
| 10 | 3500 | 3500 | 1000 | 0.15 | 0.23 | 0.12 | 0.21 | 89.4 | 25.9 | 61.9 | 5.89 |

Notes for Table I:
[1]Films made from an ethylene-acrylic acid interpolymer containing about 9 wt. % acrylic acid, having a melt flow value of about 3, and prepared at 26.7 MPa above and 20° C. above its respective two-phase transition zone.
[2]Oleyl palmitamide.
[3]Stearyl stearamide.
[4]Diatomaceous earth obtained under the designation Celite 455.
[5]See above for description of COF measurements.
[6]See above for description of block measurements.
[7]ASTM D-1746.
[8]ASTM D-1003-52.
*This composition is not within the scope of this invention; data supplied for purposes of comparison.

COMPARISON III

The procedure of Comparison I was further employed to demonstrate that an unsaturated amide (erucyl erucamide) in combination with a saturated amide (stearyl stearamide) is similarly effective in comparison to the mixed unsaturated amide in which R is saturated and R' is unsaturated (oleyl palmitamide in Table I or erucyl stearamide in Table II) in combination with the same saturated amide (stearyl stearamide). The compositions and handleability and optical characteristics are summarized in Table II.

temperature. The results presented in Table III further demonstrate the synergism observed in Tables I and II for the saturated secondary fatty acid amide in combination with the unsaturated or mixed unsaturated fatty acid amide where R is a mono-olefinically unsaturated alkyl group and R' is a saturated alkyl group (stearyl erucamide), with or without finely-divided inorganic. It should be noted that for this particular equipment, the low block range was observed to be approximately 20–75, high block was approximately 75–125, and excessive block was greater than about 125.

TABLE II

| Run[1] | Amide, ppm SS[2] | Amide, ppm ES[3] | Amide, ppm EE[4] | Inorganic, ppm[5] | Coefficient of Friction[6] Film-to-Film Static | Coefficient of Friction[6] Film-to-Film Kinetic | Coefficient of Friction[6] Film-to-Metal Static | Coefficient of Friction[6] Film-to-Metal Kinetic | Block[7] | Gloss[8] 20° | Gloss[8] 45° | Percent Haze[9] |
|---|---|---|---|---|---|---|---|---|---|---|---|---|
| 11* | 0 | 0 | 0 | 0 | 1.26 | 1.16 | 0.30 | 1.17 | 279.3 | 29.0 | 65.0 | 4.74 |
| 12* | 8000 | 0 | 0 | 0 | 0.60 | 0.80 | 0.27 | 0.35 | 66.2 | 32.5 | 67.3 | 4.36 |
| 13 | 0 | 8000 | 0 | 0 | 0.23 | 0.22 | 0.24 | 0.34 | 183.0 | 26.9 | 62.6 | 4.57 |
| 14 | 0 | 0 | 8000 | 0 | 0.20 | 0.15 | 0.24 | 0.40 | 214.9 | 28.1 | 64.3 | 4.72 |
| 15* | 0 | 0 | 0 | 8000 | 0.75 | 0.79 | 0.25 | 0.20 | 63.3 | 21.2 | 55.4 | 9.90 |
| 16 | 3500 | 3500 | 0 | 1000 | 0.14 | 0.19 | 0.22 | 0.41 | 58.3 | 24.6 | 61.5 | 5.89 |
| 17 | 3500 | 0 | 3500 | 1000 | 0.08 | 0.11 | 0.14 | 0.28 | 97.4 | 24.5 | 59.8 | 5.20 |

Notes for Table II:
[1]Films made from an ethylene-acrylic acid interpolymer containing about 9 wt. % acrylic acid, having a melt flow value of about 3, and prepared at 26.7 MPa above and 20° C. above its respective two-phase transition zone.
[2]Stearyl stearamide.
[3]Erucyl stearamide.
[4]Erucyl erucamide.
[5]Diatomaceous earth obtained under the designation Celite 455.
[6]See above for description of COF measurements.
[7]See above for description of block measurements.
[8]ASTM D-1746.
[9]ASTM D-1003-52.
*This composition is not within the scope of this invention; data supplied for purposes of comparison.

TABLE III

| Run[1] | Amide, ppm SS[2] | Amide, ppm EE[3] | Amide, ppm SE[4] | Inorganic, ppm[5] | Coefficient of Friction[6] Film-to-Film Static | Film-to-Film Kinetic | Film-to-Metal Static | Film-to-Metal Kinetic | Block, g[7] | Gloss[8] 20° | Gloss[8] 45° | Percent Haze[9] |
|---|---|---|---|---|---|---|---|---|---|---|---|---|
| 18* | 0 | 0 | 0 | 0 | >1.00 | >1.00 | >1.00 | >1.00 | 155.8 | 49.1 | 61.2 | 8.86 |
| 19* | 5000 | 0 | 0 | 0 | 0.65 | 0.67 | 0.34 | 0.43 | 71.8 | 32.5 | 58.7 | 9.49 |
| 20 | 0 | 5000 | 0 | 0 | 0.16 | 0.12 | 0.34 | 0.65 | 90.0 | 33.2 | 53.4 | 11.57 |
| 21* | 0 | 0 | 5000 | 0 | 0.24 | 0.24 | 0.32 | 0.48 | 77.8 | 31.1 | 52.0 | 9.70 |
| 22* | 0 | 0 | 0 | 5000 | 0.80 | 0.76 | 0.26 | 0.26 | 32.5 | 29.1 | 50.0 | 15.19 |
| 23* | 2500 | 0 | 0 | 2500 | 0.43 | 0.40 | 0.24 | 0.26 | 50.0 | 28.6 | 49.9 | 12.61 |
| 24* | 0 | 0 | 2500 | 2500 | 0.25 | 0.22 | 0.23 | 0.19 | 61.25 | 23.7 | 48.6 | 13.36 |
| 25 | 0 | 2500 | 0 | 2500 | 0.18 | 0.13 | 0.23 | 0.19 | 66.5 | 23.2 | 47.1 | 12.94 |
| 26 | 2500 | 2500 | 0 | 0 | 0.19 | 0.15 | 0.40 | 0.54 | 67.5 | 24.6 | 53.0 | 8.84 |
| 27 | 2500 | 0 | 2500 | 0 | 0.41 | 0.38 | 0.75 | >1.00 | 62.0 | 23.4 | 53.3 | 9.59 |
| 28 | 2000 | 0 | 2000 | 1000 | 0.18 | 0.14 | 0.26 | 0.32 | 41.5 | 27.4 | 50.3 | 10.74 |
| 29 | 2000 | 2000 | 0 | 1000 | 0.26 | 0.27 | 0.31 | 0.33 | 45.0 | 22.0 | 51.2 | 10.96 |

Notes for Table III:
[1]Films made from an ethylene-acrylic acid interpolymer containing about 6.5 wt. % acrylic acid, having a melt flow value of about 2.5, and prepared at 31.0 MPa above and 25° C. above its respective two-phase transition zone.
[2]Stearyl stearamide.
[3]Erucyl erucamide.
[4]Stearyl erucamide.
[5]Diatomaceous earth obtained under the designation Celite 455.
[6]See above for description of COF measurements.
[7]See above for description of block measurements.
[8]ASTM D-1746.
[9]ASTM D-1003-52.
*This composition is not within the scope of this invention; data supplied for purposes of comparison.

COMPARISON V

The procedure of Comparison I was employed to demonstrate the effectiveness of certain amides used alone as additives for a superior random ethylene interpolymer (9 wt. % acrylic acid, melt flow value 3.0, prepared at 26.7 MPa above and 20° C. above its respective phase transition zone), and also for a random ethylene interpolymer (9 wt. % acrylic acid, melt flow value 3.0, prepared at 3.3 MPa above and 15° C. above its respective transition zone). The composition and slip characteristics are summarized in Table IV. Note that oleyl palmitamide, which is substantially ineffective in the random ethylene interpolymer, is effective in the superior random ethylene interpolymer to improve slip characteristics. Note also that erucyl erucamide and erucyl stearamide in contrast to the lower molecular weight oleyl oleamide and oleyl palmitamide, which were ineffective in the compositions of U.S. Pat. No. 3,597,382, are effective in the random ethylene interpolymer composition of the present invention. These results are rather surprising in that, since the compositionally uniform interpolymers generally result in smoother film surfaces with concomitantly higher COF's, the superior random interpolymer resulting in even smoother film surfaces than the random interpolymers, it would be expected that the handling properties of such compositions would be more difficult to improve.

TABLE IV

| Run | Inter-polymer | Amide Type | Amide ppm | Coefficient of Friction[6] Film-to-Film Static | Film-to-Film Kinetic | Film-to-Metal Static | Film-to-Metal Kinetic |
|---|---|---|---|---|---|---|---|
| 30* | A[1] | — | 0 | 1.40 | 1.40 | 0.60 | 0.60 |
| 31 | A[1] | OP[3] | 2000 | 1.33 | 1.25 | 0.27 | 0.37 |
| 32 | A[1] | EE[4] | 2000 | 0.22 | 0.22 | 0.29 | 0.25 |
| 33 | A[1] | ES[5] | 2000 | 0.18 | 0.17 | 0.30 | 0.31 |
| 34* | B[2] | — | 0 | 1.26 | 1.16 | 0.30 | 1.17 |
| 35 | B[2] | OP[3] | 2000 | 0.34 | 0.55 | 0.31 | 0.40 |

Notes for Table IV:
[1]Film made from a random ethylene-acrylic acid interpolymer containing about 9 wt. % acrylic acid, having a melt flow value of about 3, and prepared at 3.3 MPa above and 15° C. above its respective two-phase transition zone.
[2]Film made from a superior random ethylene-acrylic acid interpolymer containing about 9 wt. % acrylic acid, having a melt flow value of about 3, and prepared at 26.7 MPa above and 20° C. above its respective two-phase transition zone.
[3]Oleyl palmitamide.
[4]Erucyl erucamide.
[5]Erucyl stearamide.
[6]See above for description of COF measurements.
*This composition is not within the scope of this invention; data supplied for purposes of comparison.

COMPARISON VI

Additional data confirming the results of Comparison V was obtained by fabricating various interpolymers with various single amide additives into 30.5 cm layflat film by usual inflation techniques on a 3.81 cm Egan blown film unit at 204° C. plastic temperature. Both the superior random and the compositionally non-uniform interpolymers used contained 6.5 weight percent acrylic acid and had a melt flow value of 2.5 dg/min. However, the superior random interpolymer was prepared at 31.0 MPa and 15° C. above its respective phase transition zone, while the non-uniform interpolymer was prepared below its respective phase transition zone. The results are presented in Table V.

TABLE V

| Run | Inter-polymer | Amide Type | Amide ppm | Coefficient of Friction[6] Film-to-Film Static | Film-to-Film Kinetic | Film-to-Metal Static | Film-to-Metal Kinetic |
|---|---|---|---|---|---|---|---|
| 36* | A[1] | — | 0 | >1.00 | >1.00 | 0.74 | 0.77 |
| 37* | B[2] | — | 0 | >1.00 | >1.00 | 0.64 | 0.85 |
| 38 | A[1] | EE[3] | 2000 | 0.19 | 0.13 | 0.49 | 0.84 |
| 39 | B[2] | EE | 2000 | 0.14 | 0.10 | 0.48 | 0.52 |
| 40* | A[1] | SE[4] | 2000 | 0.40 | 0.23 | 0.45 | 0.80 |
| 41* | B[2] | SE | 2000 | 0.36 | 0.32 | 0.58 | 0.65 |
| 42* | A[1] | SS[5] | 2000 | >1.00 | >1.00 | 0.80 | 0.95 |

TABLE V-continued

| Run | Inter-polymer | Amide Type | ppm | Coefficient of Friction[6] | | | |
|---|---|---|---|---|---|---|---|
| | | | | Film-to-Film | | Film-to-Metal | |
| | | | | Static | Kinetic | Static | Kinetic |
| 43* | B[2] | SS | 2000 | >1.00 | >1.00 | 0.56 | 0.77 |

Notes for Table V:
[1]Film made from a superior random ethylene-acrylic acid interpolymer containing about 6.5 wt. % acrylic acid, having a melt flow value of about 2.5, and prepared at 31.0 MPa above and 15° C. above its respective two-phase transition zone.
[2]Film made from a compositionally non-uniform ethylene-acrylic acid interpolymer containing about 6.5 wt. % acrylic acid, having a melt flow value of about 2.5, and below its respective two-phase transition zone.
[3]Erucyl erucamide.
[4]Stearyl erucamide.
[5]Stearyl stearamide.
[6]See above for description of COF measurements.
*This composition is not within the scope of this invention; data supplied for purposes of comparison.

While we have described the composition and film of the invention above, many variations in the ingredients and proportions thereof, as well as in their manner of preparation, will occur to those skilled in the art. It is intended that all such variations which fall within the scope and spirit of the appended claims be embraced thereby.

We claim:
1. A composition, comprising:
 (a) ethylene interpolymer selected from the group consisting of:
  (1) ethylene interpolymers having acrylic acid interpolymerized therein in an amount of from about 2 to about 35 percent by weight of the interpolymer;
  (2) ethylene interpolymers having methacrylic acid interpolymerized therein in an amount of from about 2 to about 35 percent by weight of the interpolymer; and
  (3) ionomers of such ethylene-acrylic acid and ethylene-methacrylic acid interpolymers in which from about 5 to about 95 percent of the carboxyl groups therein are neutralized with metal cations;
 said ethylene interpolymer having a melt flow value of from about 0.01 to about 50 dg/min;
 (b) compounded with said interpolymer, from about 0.025 to about 1 percent, by weight of the composition, of saturated secondary fatty acid amide of the formula $R_1—CO—NH—R_2$, wherein $R_1$ is a saturated alkyl group having from 13 to 25 carbon atoms and $R_2$ is a saturated alkyl group having from 14 to 26 carbon atoms; and
 (c) compounded with said interpolymer, from about 0.025 to about 1 percent, by weight of the composition, of unsaturated or mixed unsaturated secondary fatty acid amide of the formula $R_3—CO—NH—R_4$, wherein $R_3$ is a mono-olefinically unsaturated alkyl group having from 17 to 23 carbon atoms or a saturated alkyl group having from 13 to 25 carbon atoms, $R_4$ is a mono-olefinically unsaturated alkyl group having from 18 to 24 carbon atoms or a saturated alkyl group having from 14 to 26 carbon atoms, and at least one of said $R_3$ and $R_4$ is mono-olefinically unsaturated.

2. The composition of claim 1, wherein the melt flow value of the ethylene interpolymer is from about 0.5 to about 25 dg/min.

3. The composition of claim 1, wherein the ethylene interpolymer has acrylic acid interpolymerized therein in an amount of from about 5 to about 20 percent by weight of the interpolymer.

4. The composition of claim 1, wherein the ethylene interpolymer has methacrylic acid interpolymerized therein in an amount of from about 5 to about 20 percent by weight of the interpolymer.

5. The composition of claim 1, wherein the ethylene interpolymer comprises said ionomer in which said cations are selected from the group consisting of: cations of zinc, sodium, magnesium, potassium, lithium, calcium and barium.

6. The composition of claim 1, further comprising compounded with said interpolymer, finely divided inorganic in an amount of from about 0.025 to about 1.5 percent by weight of the composition.

7. The composition of claim 6, wherein said finely divided inorganic has a surface area of from about 0.7 to about 75 $m^2/g$, an oil absorption value of from about 21 to about 175 g oil per 100 g inorganic, and a weight average particle size of from about 0.02 to about 30 microns with at least 60 percent of the particles being less than or about equal to the average particle size.

8. The composition of claim 1, wherein said ethylene interpolymer is prepared by interpolymerization at reactor pressure and temperature above its respective two-phase transition zone.

9. The composition of claim 1, wherein the composition is a film.

10. A composition, comprising:
 (a) ethylene interpolymer selected from the group consisting of:
  (1) ethylene interpolymers having acrylic acid interpolymerized therein in an amount of from about 5 to about 20 percent by weight of the interpolymer;
  (2) ethylene interpolymers having methacrylic acid interpolymerized therein in an amount of from about 5 to about 20 percent by weight of the interpolymer; and
  (3) ionomers of such ethylene-acrylic acid and ethylene-methacrylic acid interpolymers in which from about 5 to about 95 percent of the carboxyl groups therein are neutralized with metal cations selected from the group consisting of cations of zinc, sodium, magnesium, potassium, lithium, calcium and barium;
 said ethylene interpolymer having a melt flow value of from about 0.5 to about 25 dg/min and prepared by interpolymerization at reactor pressure and temperature above its respective two-phase transition zone;
 (b) compounded with said interpolymer, from about 0.025 to about 1 percent, by weight of the composition, of saturated secondary fatty acid amide of the formula $R_1—CO—NH—R_2$, wherein $R_1$ is a saturated alkyl group having from 13 to 25 carbon atoms and $R_2$ is a saturated alkyl group having from 14 to 26 carbon atoms; and
 (c) compounded with said interpolymer, from about 0.025 to about 1 percent, by weight of the composition of unsaturated or mixed unsaturated secondary fatty acid amide of the formula $R_3—CO—NH—R_4$, wherein $R_3$ is a mono-olefinically unsaturated alkyl group having from 17 to 23 carbon atoms or a saturated alkyl group having from 13 to 25 carbon atoms, $R_4$ is a mono-olefinically unsaturated alkyl group having from 18 to 24 carbon atoms or a saturated alkyl group having from 14 to 26 carbon atoms, and at least one of said $R_3$ and $R_4$ is mono-olefinically unsaturated.

11. The composition of claim 10, wherein said ethylene interpolymer is prepared by interpolymerization at reactor pressure and temperature at least about 26.7 MPa and about 20° C., respectively, above its two-phase transition zone, and wherein said interpolymer has a ratio of adjacent interpolymerized polar monomer groups to the total interpolymerized polar monomer groups less than 0.44.

12. The composition of claim 10, wherein the amide group of said saturated secondary fatty acid amide of which said $R_1$ is a part is selected from the group consisting of: lauramide, palmitamide, stearamide, arachidamide, behenamide, lignoceramide, and cerotamide.

13. The composition of claim 10, wherein said $R_2$ is selected from the group consisting of: lauryl, palmityl, stearyl, arachidyl, behenyl, lignoceryl, and cerotyl.

14. The composition of claim 10, wherein the amide group of said unsaturated or mixed unsaturated secondary fatty acid of which said $R_3$ is a part is selected from the group consisting of: lauramide, palmitamide, stearamide, arachidamide, behenamide, lignoceramide, cerotamide, oleamide, elaidamide, vaccenamide, and erucamide.

15. The composition of claim 10, wherein said $R_4$ is selected from the group consisting of: lauryl, palmityl, stearyl, arachidyl, behenyl, lignoceryl, cerotyl, oleyl, elaidyl, vaccenyl, and erucyl.

16. The composition of claim 10, further comprising compounded with said interpolymer, finely divided inorganic in an amount of from about 0.025 to about 1.5 percent by weight of the composition, said finely divided inorganic having a surface area of from about 0.7 to about 75 m$^2$/g, an oil absorption value of from about 21 to about 175 g oil per 100 g inorganic, and a weight average particle size of from about 0.02 to about 30 microns with at least 60 percent of the particles being less than or about equal to the average particle size.

17. The composition of claim 16, wherein said finely divided inorganic is selected from the group consisting of: clay, aluminum silicate, diatomaceous earth, silica, talc, limestone, fumed silica, magnesium sulfate, magnesium silicate, alumina trihydrate, magnesium oxide, zinc oxide, and combinations thereof.

18. The composition of claim 10, wherein the composition is a film.

19. A composition, comprising:
(a) ethylene interpolymer selected from the group consisting of:
(1) ethylene interpolymers having acrylic acid interpolymerized therein in an amount of from about 5 to about 20 percent by weight of the interpolymer;
(2) ethylene interpolymers having methacrylic acid interpolymerized therein in an amount of from about 5 to about 20 percent by weight of the interpolymer; and
(3) ionomers of such ethylene-acrylic acid and ethylene-methacrylic acid interpolymers in which from about 5 to about 95 percent of the carboxyl groups therein are neutralized with metal cations selected from the group consisting of: cations of zinc, sodium, magnesium, potassium, lithium, calcium and barium and combinations thereof;

said ethylene interpolymer having a melt flow value of from about 0.5 to about 25 dg/min, a ratio of adjacent interpolymerized polar monomer groups to the total interpolymerized polar monomer groups less than 0.44, and being prepared by interpolymerization at reactor pressure and temperature at least about 26.7 MPa and about 20° C., respectively, above its two-phase transition zone;

(b) compounded with said interpolymer, from about 0.025 to about 1 percent, by weight of the composition, of saturated secondary fatty acid amide of the formula $R_1$—CO—NH—$R_2$, wherein the amide group of which $R_1$ is a part is selected from the group consisting of: lauramide, palmitamide, stearamide, arachidamide, behenamide, lignoceramide, and cerotamide; and $R_2$ is selected from the group consisting of: lauryl, palmityl, stearyl, arachidyl, behenyl, lignoceryl, and cerotyl;

(c) compounded with said interpolymer, from about 0.025 to about 1 percent, by weight of the composition, of unsaturated or mixed unsaturated secondary fatty acid amide of the formula $R_3$—CO—NH—$R_4$, wherein the amide group of which $R_3$ is a part is selected from the group consisting of: lauramide, palmitamide, stearamide, arachidamide, behenamide, lignoceramide, cerotamide, oleamide, elaidamide, vaccenamide, and erucamide; $R_4$ is selected from the group consisting of: lauryl, palmityl, stearyl, arachidyl, behenyl, lignoceryl, cerotyl, oleyl, elaidyl, vaccenyl, and erucyl; and at least one of said $R_3$ and $R_4$ is mono-olefinically unsaturated; and (d) compounded with said interpolymer, finely divided inorganic in amount of from about 0.025 to about 1.5 percent by weight of the composition, said finely divided inorganic having a surface area of from about 0.7 to about 75 m$^2$/g, an oil absorption value of from about 21 to about 175 g oil per 100 g inorganic, a weight average particle size of from about 0.02 to about 30 microns with at least 60 percent of the particles being less than or about equal to the average particle size and being selected from the group consisting of: clay, aluminum silicate, diatomaceous earth, silica, talc, limestone, fumed silica, magnesium sulfate, magnesium silicate, alumina trihydrate, magnesium oxide, zinc oxide, and combinations thereof.

20. The composition of claim 19, wherein the composition is a film.

21. A composition, comprising:
(a) ethylene interpolymer selected from the group consisting of:
(1) ethylene interpolymers having acrylic acid interpolymerized therein in an amount of from about 2 to about 35 percent by weight of the interpolymer;
(2) ethylene interpolymers having methacrylic acid interpolymerized therein in an amount of from about 2 to about 35 percent by weight of the interpolymer; and
(3) ionomers of such ethylene-acrylic acid and ethylene-methacrylic acid interpolymers in which from about 5 to about 95 percent of the carboxyl groups therein are neutralized with metal cations;

said ethylene interpolymer having a melt flow value of from about 0.01 to about 50 dg/min;

(b) compounded with said interpolymer, from about 0.05 to about 2 percent, by weight of the composition, of unsaturated secondary fatty acid amide of the formula $R_1$—CO—NH—$R_2$, wherein $R_1$ is a mono-olefinically unsaturated alkyl group having from 19 to 23 carbon atoms, and $R_2$ is a mono-olefinically unsaturated alkyl group having from 20 to 24 carbon atoms.

22. A composition, comprising:
(a) ethylene interpolymer selected from the group consisting of:
   (1) ethylene interpolymers having acrylic acid interpolymerized therein in an amount of from about 2 to about 35 percent by weight of the interpolymer;
   (2) ethylene interpolymers having methacrylic acid interpolymerized therein in an amount of from about 2 to about 35 percent by weight of the interpolymer; and
   (3) ionomers of such ethylene-acrylic acid and ethylene-methacrylic acid interpolymers in which from about 5 to about 95 percent of the carboxyl groups are neutralized with metal cations;
said ethylene interpolymer having a melt flow value of from about 0.01 to about 50 dg/min and being prepared by interpolymerization at reactor pressure and temperature above its respective two-phase transition zone; and
(b) compounded with said interpolymer, from about 0.05 to about 2 percent, by weight of the composition, of an unsaturated secondary fatty acid amide of the formula $R_1$—CO—NH—$R_2$, wherein $R_1$ is a mono-olefinically unsaturated alkyl group having from 17 to 23 carbon atoms, and $R_2$ is a mono-olefinically unsaturated alkyl group having from 18 to 24 carbon atoms.

23. The composition of claim 21 or 22 wherein said ethylene interpolymer is prepared by interpolymerization at reactor pressure and temperature at least about 26.7 MPa and about 20° C., respectively, above its two-phase transition zone, and wherein said interpolymer has a ratio of adjacent interpolymerized polar monomer groups to the total interpolymerized polar monomer groups less than 0.44.

24. The composition of claim 21 or 22 wherein the melt flow value of the ethylene interpolymer is from about 0.5 to about 25 dg/min.

25. The composition of claim 21 or 22 wherein the ethylene interpolymer has acrylic acid interpolymerized therein in an amount of from about 5 to about 20 percent by weight of the interpolymer.

26. The composition of claim 21 or 22 wherein the ethylene interpolymer has methacrylic acid interpolymerized therein in an amount of from about 5 to about 20 percent by weight of the interpolymer.

27. The composition of claim 21 or 22 wherein the ethylene interpolymer comprises said ionomer in which said cations are selected from the group consisting of: cations of zinc, sodium, magnesium, potassium, lithium, calcium and barium.

28. The composition of claim 21 or 22 further comprising compounded with said interpolymer, finely divided inorganic in an amount of from about 0.025 to about 1.5 percent by weight of the composition.

29. The composition of claim 28, wherein said finely divided inorganic has a surface area of from about 0.7 to about 75 $m^2/g$, an oil absorption value of from about 21 to about 175 g oil per 100 g inorganic, and a weight average particle size of from about 0.02 to about 30 microns with at least 60 percent of the particles being less than or about equal to the average particle size.

30. The composition of any of claims 21 or 22 wherein the composition is a film.

31. The composition of claim 21 or 22, wherein the amide group of which said $R_1$ is a part selected from the group consisting of: vaccenamide, and erucamide; and
   wherein said $R_2$ is selected from the group consisting of: oleyl, elaidyl, vaccenyl, and erucyl.

32. The composition of claim 29, wherein said finely divided inorganic is selected from the group consisting of: clay, aluminum silicate, diatomaceous earth, silica, talc, limestone, fumed silica, magnesium sulfate, magnesium silicate, alumina trihydrate, magnesium oxide, zinc oxide, and combinations thereof.

* * * * *